US011119981B2

(12) United States Patent
Sarkar et al.

(10) Patent No.: US 11,119,981 B2
(45) Date of Patent: Sep. 14, 2021

(54) SELECTIVELY REDIRECT-ON-WRITE DATA CHUNKS IN WRITE-IN-PLACE FILE SYSTEMS

(71) Applicant: HEWLETT PACKARD ENTERPRISE DEVELOPMENT LP, Houston, TX (US)

(72) Inventors: Shyamalendu Sarkar, Bangalore (IN); Sri Satya Sudhanva Kambhammettu, Bangalore (IN); Narayanan Ananthakrishnan Nellayi, Bangalore (IN); Naveen B, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 878 days.

(21) Appl. No.: 15/796,527

(22) Filed: Oct. 27, 2017

(65) Prior Publication Data
US 2019/0129950 A1 May 2, 2019

(51) Int. Cl.
G06F 16/00 (2019.01)
G06F 16/14 (2019.01)
G06F 3/06 (2006.01)
G06F 16/13 (2019.01)
G06F 16/188 (2019.01)

(52) U.S. Cl.
CPC .............. G06F 16/14 (2019.01); G06F 3/064 (2013.01); G06F 3/0613 (2013.01); G06F 3/0614 (2013.01); G06F 3/0643 (2013.01); G06F 16/13 (2019.01); G06F 16/188 (2019.01)

(58) Field of Classification Search
USPC ........................................................ 707/737
See application file for complete search history.

(56) References Cited

U.S. PATENT DOCUMENTS

| 7,409,494 | B2 | 8/2008 | Edwards et al. |
| 7,562,189 | B2 | 7/2009 | Hamilton et al. |
| 7,593,975 | B2 | 9/2009 | Edwards et al. |
| 7,769,717 | B2 | 8/2010 | Federwisch et al. |
| 7,783,828 | B1 | 8/2010 | Talagala et al. |
| 9,395,929 | B2 | 7/2016 | Bojinov et al. |
| 9,696,913 | B1* | 7/2017 | Aron ..................... G06F 3/0611 |
| 10,169,387 | B1* | 1/2019 | Zhao ....................... H03M 7/30 |
| 2001/0001872 | A1* | 5/2001 | Singh .................. G06F 12/0802 |
| | | | 711/129 |

(Continued)

OTHER PUBLICATIONS

Peter Macko et al., "Tracking Back References in a Write-anywhere File System," May 21, 2012, pp. 1-14.

(Continued)

Primary Examiner — Vincent F Boccio
(74) Attorney, Agent, or Firm — Hewlett Packard Enterprise Patent Department (57) ABSTRACT

In one example, a method may include receiving a write operation corresponding to a portion of a data chunk stored at a first storage location in a write-in-place file system. The write-in-place file system may include encoded data chunks and unencoded data chunks. The method may include determining whether the data chunk is an encoded data chunk based on metadata associated with the data chunk, modifying the data chunk based on the write operation, and selectively performing a redirect-on-write operation on the modified data chunk based on the determination.

19 Claims, 7 Drawing Sheets

(56) References Cited

U.S. PATENT DOCUMENTS

| | | | | |
|---|---|---|---|---|
| 2007/0083571 | A1* | 4/2007 | Meller | G06F 8/654 |
| 2009/0307249 | A1* | 12/2009 | Koifman | G06F 3/0659 |
| 2010/0185690 | A1* | 7/2010 | Evans | G06F 16/113 |
| | | | | 707/803 |
| 2012/0151222 | A1* | 6/2012 | Koifman | G06F 16/1727 |
| | | | | 713/189 |
| 2015/0006835 | A1 | 1/2015 | Oberhofer et al. | |
| 2017/0031940 | A1 | 2/2017 | Subramanian et al. | |
| 2017/0116215 | A1* | 4/2017 | Ramaiyer | G06F 16/2282 |

OTHER PUBLICATIONS

Vineet Chadha and Renato J. Figueiredo, "ROW-FS: A User-level Virtualized Redirect-on-write Distributed File System for Wide Area Applications," International Conference on High-Performance Computing, 2007, pp. 1-14, Springer, Berlin, Heidelberg.

IOMARK, "Product and Services", available online at <https://web.archive.org/web/20171021163115/http://www.iomark.org/content/products-and-services>, Oct. 21, 2017, 2 pages.

VDI-IOMARK, "Products and Services", available online at <https://web.archive.org/web/20170223060151/http://iomark.org/category/site-content/vdi-iomark>, Feb. 23, 2017, 2 pages.

Wikipedia, "Extent (file systems)", available online at https://en.wikipedia.org/w/index.php?title=Extent_(file_systems)&oldid=798176160, Aug. 31, 2017, 2 pages.

* cited by examiner

| CHUNKS | LOGICAL OFFSET (KB) | DISK OFFSET (KB) | DISK BLOCK NUMBERS (LBN) (IN 512-BYTE BLOCKS) | CHUNK ATTRIBUTE |
|---|---|---|---|---|
| CHUNK 1 | 0 - 64 | 0 - 64 | 0 - 127 | UNCOMPRESSED |
| CHUNK 2 | 64 - 128 | 64 - 72 | 128 - 143 | COMPRESSED |
| CHUNK 3 | 128 - 192 | 128 - 192 | 144 - 271 | UNCOMPRESSED |

FIG. 3A — 300A

| CHUNKS | LOGICAL OFFSET (KB) | DISK OFFSET (KB) | DISK BLOCK NUMBERS (LBN) (IN 512-BYTE BLOCKS) | CHUNK ATTRIBUTE |
|---|---|---|---|---|
| CHUNK 1 | 0 - 64 | 0 - 64 | 0 - 127 | UNCOMPRESSED |
| CHUNK 2 | 64 - 128 | 64 - 72 | 128 - 143 | COMPRESSED |
| CHUNK 3 | 128 - 192 | 128 - 192 | 144 - 271 | UNCOMPRESSED |

FIG. 3B — 300B

| CHUNKS | LOGICAL OFFSET (KB) | DISK OFFSET (KB) | DISK BLOCK NUMBERS (LBN) (IN 512-BYTE BLOCKS) | CHUNK ATTRIBUTE |
|---|---|---|---|---|
| CHUNK 1 | 0 - 64 | 0 - 64 | 0 - 127 | UNCOMPRESSED |
| CHUNK 2 | 64 - 128 | 64 - 80 | 300 - 331 | COMPRESSED |
| CHUNK 3 | 128 - 192 | 128 - 192 | 144 - 271 | UNCOMPRESSED |

SELECTIVELY REDIRECT-ON-WRITE DATA CHUNKS IN WRITE-IN-PLACE FILE SYSTEMS

BACKGROUND

A file server or filer may provide the services relating to the organization of information on storage devices, such as disks. The file server may include a storage operating system that implements a file system to logically organize the information as a hierarchical structure of directories and files on the disks. Each "on-disk" file may be implemented as a set of data structures, e.g., disk blocks or data blocks, to store information. A directory, on the other hand, may be implemented as a specially formatted file in which information about other files and directories are stored.

A file server may operate according to a client/server model of information delivery to allow many clients to access files stored on the file server, e.g., the filer. In this model, the client may include an application, such as a database application, executing on a computer that "connects" to the filer over a direct connection or a computer network, such as a point-to-point link, shared local area network (LAN), wide area network (WAN), or virtual private network (VPN) implemented over a public network such as the Internet. Each client may request the services of the file system on the filer by issuing file system protocol messages (i.e., in the form of packets) to the filer over the network.

BRIEF DESCRIPTION OF THE DRAWINGS

Certain examples are described in the following detailed description and in reference to the drawings, in which.

DETAILED DESCRIPTION

File servers may implement a file system to logically organize information as a hierarchical structure of directories and files on, e.g., the disks. The data storage area of the disks may be divided into data blocks, which can be managed by the file system. The file system may determine how and where data can be stored and retrieved. For example, the data may be organized, managed, and accessed as data files, and/or as data blocks. Thus, the file server may provide clients with a file-level access and/or a block-level access to stored data.

An example of the file system may include an extent-based file system that provides a sequential layout of data through large extents, thereby helps in maintaining a better locality of data at the file level. Another example of the file system may include a write-in-place file system that writes a data block to the same physical storage location on a disk when the data block is modified.

Further, the extent-based file system can be implemented as a write-in-place file system to provide advantages, such as, achieving the locality of data at a physical on-disk layout and across rewrites. Maintaining the locality both at a logical layer and a physical layer of the file may provide advantages such as (a) better optimization by detecting the hotness of disk blocks/data blocks, (b) efficient deduplication, as the sequential data layout with larger extents may help in faster data comparison due to less hash computations.

However, extent-based write-in-place file systems may provide challenges with respect to features such as data compression and data encryption. Extent-based write-in-place file systems may have extents larger in size when compared to a physical sector size of underlying hardware. Therefore, features such as data compression and data encryption, that encode the client data, may introduce challenges for the write-in-place file systems as the write-in-place file systems may no longer rewrite the modified data in-place.

For example, the size of a compressed data chunk may be larger than the atomicity granularity provided by the disk. The compressed data chunk may be written with much smaller disk sector granularity and hence the atomicity or consistency of the data may be at stake if partial data reaches the disk, for instance, due to loss of connectivity or a system crash. In such scenarios, the file system may lose the capability to regenerate data from the encrypted or compressed form.

A rewrite operation of a compressed data chunk may involve the sequence of (a) reading the compressed data chunk, (b) decompressing the compressed data chunk to generate a decoded data chunk, (c) merging the decompressed data chunk with the new data, (d) recompressing the logical region to form the new compressed data chunk, and (e) rewriting the new compressed data chunk to the disk.

For a write-in-place file system, the inherent nature of a rewrite operation is to rewrite and reuse the same storage data blocks, and on the need basis, truncate or append storage to fit the new compressed data chunk. With the smaller disk sector granularity, the rewrite operation may have a possibility of losing data consistency. If the new compressed chunk does not reach the disk before an abrupt system outage (e.g., system crash), the logical region becomes unrecoverable since the data chunk may no longer be de-compressible. A program that performed the compression may not be able to interpret the compressed data chunk and hence decompression can fail to regenerate the original data.

Some methods may adopt write-anywhere file systems, however, write-anywhere file systems may have a set of pitfalls on a rewrite, for example, fragmentation, loss in locality and sequential layout, higher metadata usage, inability to correctly predict hot disk blocks, and the like. With the write-anywhere file systems, after rewrite operations, even sequential read operations may cause random access of the disk. Random access operations to a fragmented file can be slower than sequential access operations and hence may impact the performance of the write-anywhere file systems.

Examples described herein may provide a capability to perform redirect-on-write operations in the write-in-place file system on a need basis. In one example, a write operation may be received corresponding to a portion of a data chunk stored at a first storage location in a write-in-place file system. The write-in-place file system may include encoded data chunks and unencoded data chunks. Further, a check is made to determine whether the data chunk may be an encoded data chunk based on metadata associated with the data chunk. Furthermore, the data chunk may be modified based on the write operation. In addition, a redirect-on-write operation may be selectively performed on the modified data chunk based on the determination.

Examples described herein may enable a write-in-place file system to reap benefits provided by features such as compression and encryption, while retaining the inherent benefits of the write-in-place file system. Examples described herein may enhance the performance of workloads in a virtual desktop infrastructure (VDI) environment.

Figure 1A:
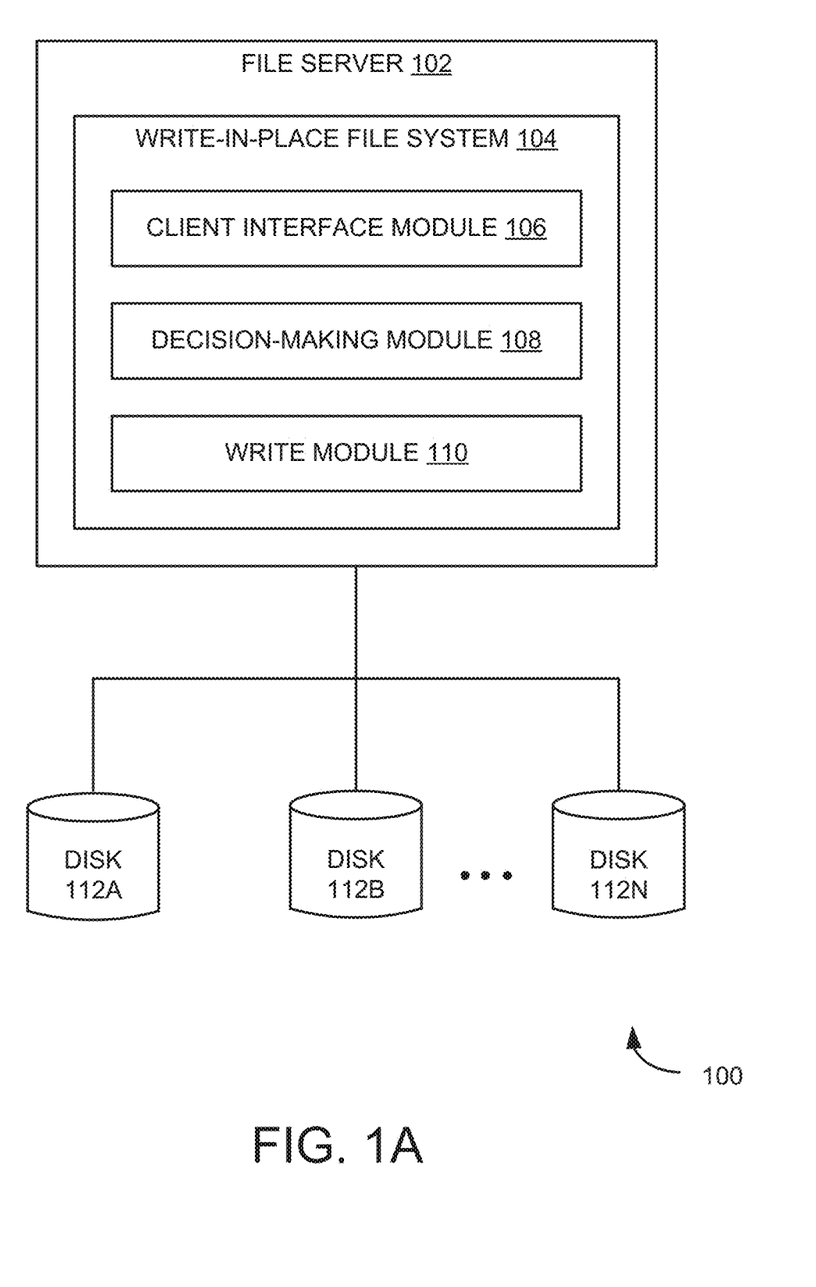
FIG. 1A is a block diagram of an example system including an example file server to selectively perform a redirect-on-write operation on data chunks in a write-in-place file system.
Figure 1B:
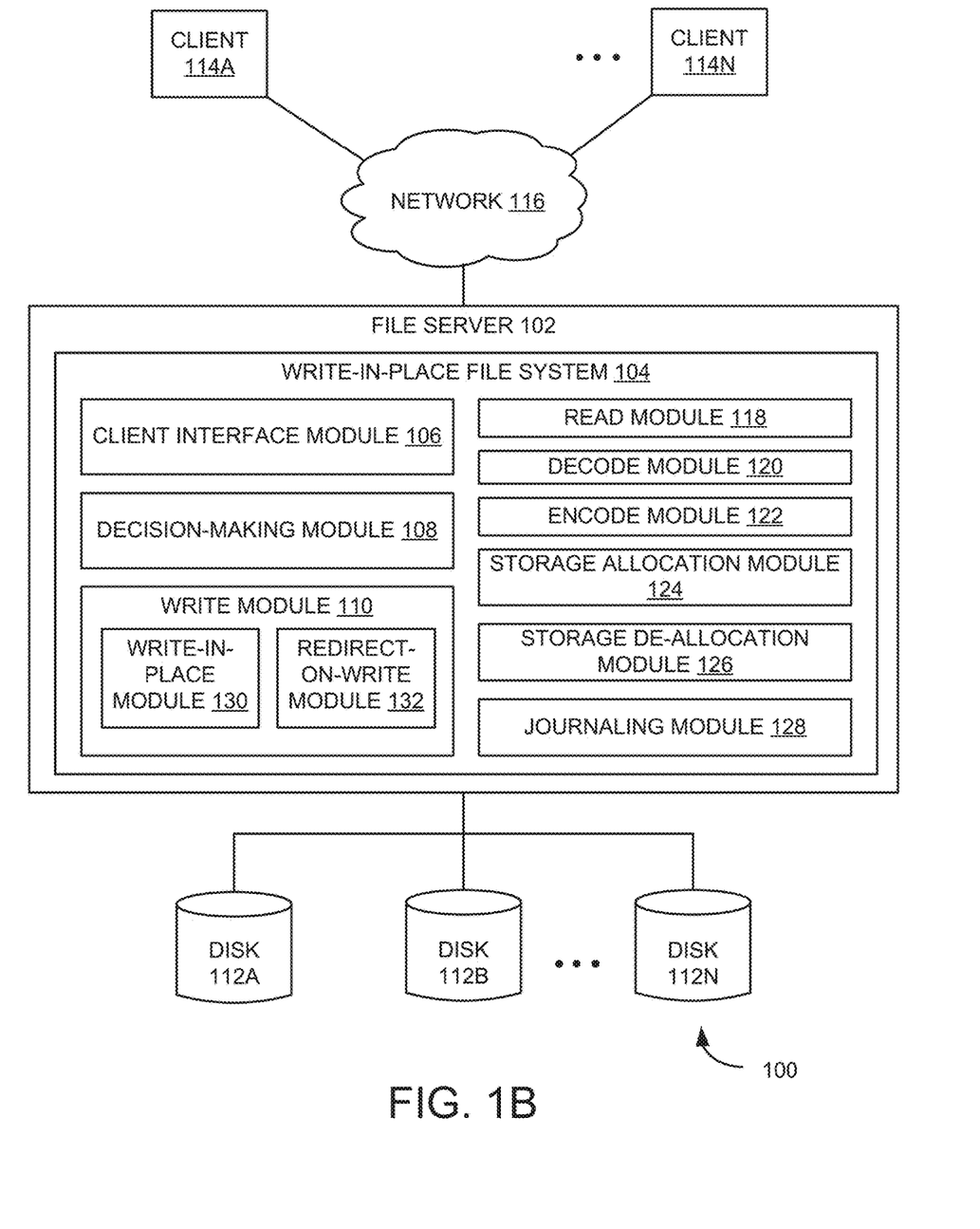
FIG. 1B is a block diagram of the example system of FIG. 1A, depicting additional features.

FIG. 1A is a block diagram of an example system 100 including an example file server 102 to selectively perform a redirect-on-write operation on data chunks in a write-in-place file system 104. FIG. 1B is a block diagram of example system 100 of FIG. 1A, depicting additional features. System 100 may include file server 102 and disks 112A-N coupled to file server 102.

Write-in-place file system may refer to a file system that writes a data block to the same physical storage location on a disk (e.g., 112) when the data block is modified. In one example, write-in-place file system 104 can be implemented as an extent-based file system, in which data blocks may be allocated in extents. An extent may be a contiguous set of data blocks. Extents may be allocated for each file. A file may include at least one extent. Write-in-place file system 104 can reference each data block via disk block numbers. Hence, the disk block numbers for the data blocks after an initial write can be contiguous and sequentially laid out on the disk 112.

Figure 5A:
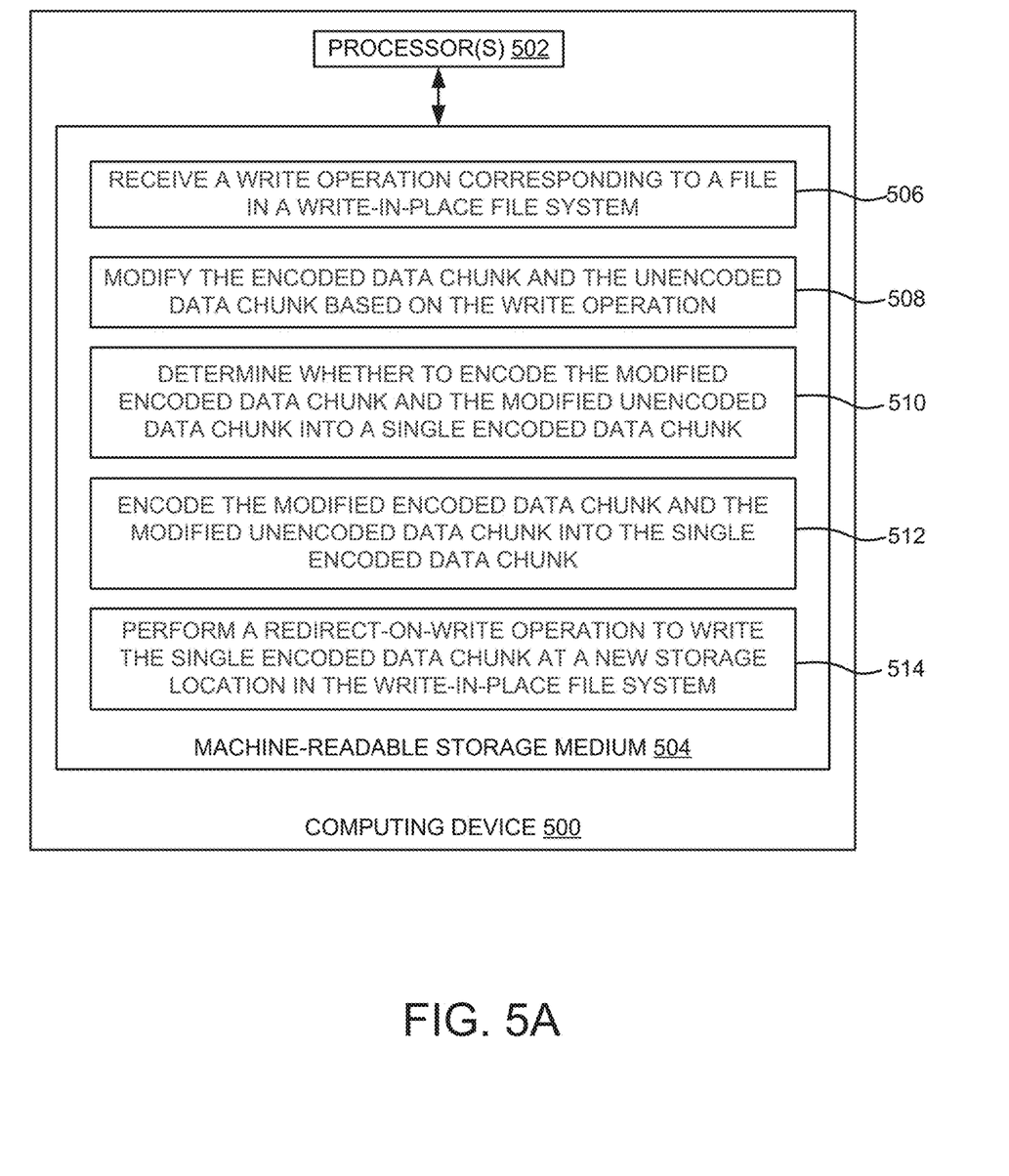
FIG. 5A is a block diagram of an example computing device for performing a redirect-on-write operation on encoded data chunks in a write-in-place file system.
Figure 5B:
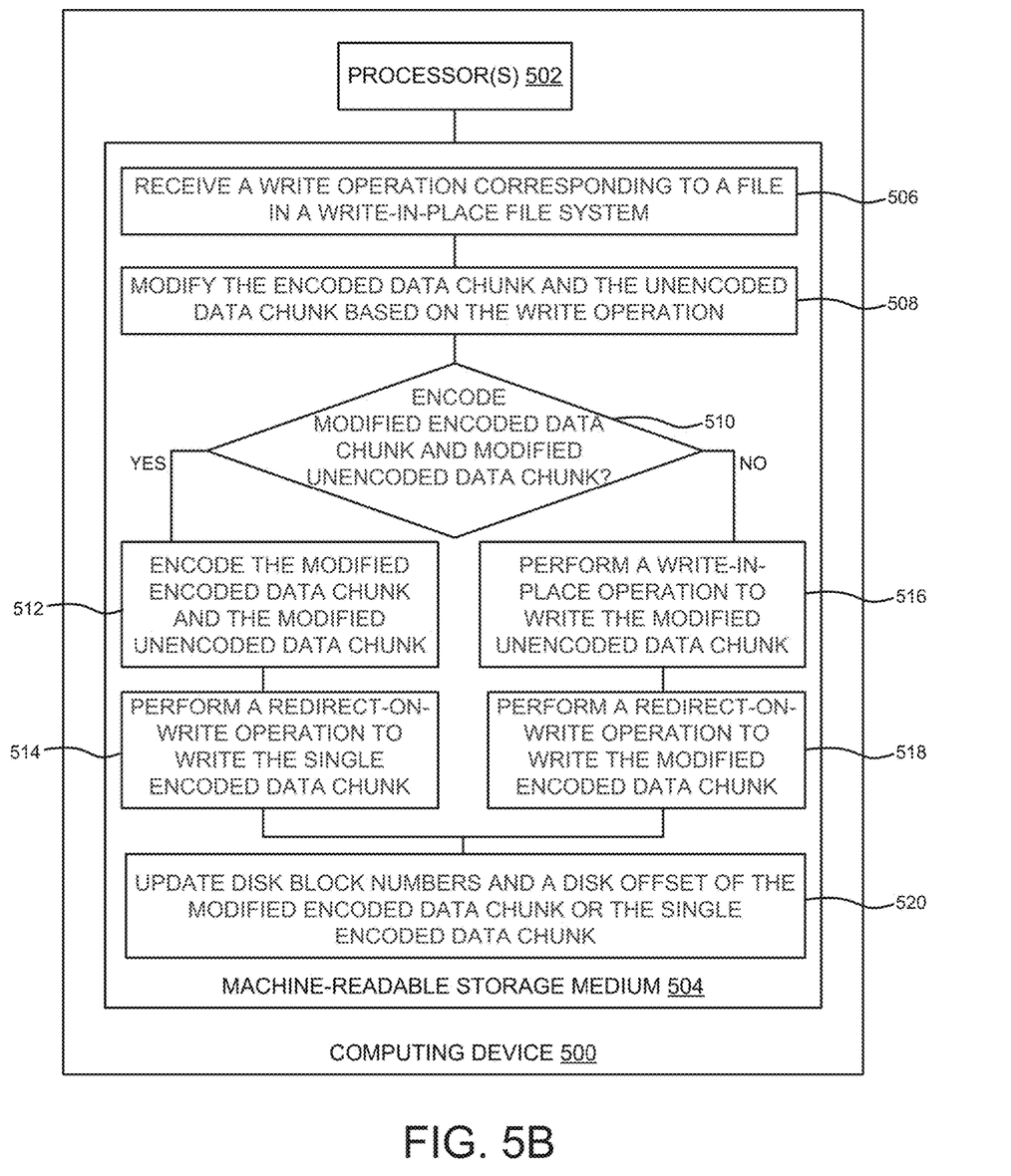
FIG. 5B is a block diagram of the example computing device of FIG. 5A, depicting additional features.

File server 102 may be a computing device that provides file services relating to the organization of information on storage devices, such as disks 112A-N. File server 102 may include at least one processor, and memory coupled to the processor (e.g., as shown in FIGS. 5A and 5B) to perform operations related to storage management and service data access requests.

As shown in FIG. 1B, system 100 may include clients 114A-N. Clients 114A-N may refer to computing devices that access data on the storage system (e.g., disks 112A-N) via read and/or write operations. Clients 114A-N may be coupled to a network 116. As used herein, coupling may refer to any type of connectivity, whether electrical, mechanical, and/or communicative. Coupling of one device to another may occur through other hardware. Software components can be coupled through function calls, or other invocations of one routine/subroutine by another.

Network 116 may represent any type of network with associated hardware and software components. Example network 116 may include at least one of a local area network (LAN), wide area network (WAN), metropolitan area network (MAN), global area network (GAN) such as the Internet, or any combination thereof. The connectivity hardware may include a Category-5 or other twisted pair cable, coaxial cable, wireless communication transceivers, and the like, as well as flow direction hardware (e.g., interface circuits/cards, switches, routers, and servers).

Example client 114 may be a desktop computer, a laptop computer, workstation, a network server, mobile device such as a cellular telephone or personal digital assistant (PDA), and the like. Each client 114 may include an application, such as a database application, executing therein that "connects" to file server 102 over network 116. File server 102 may be coupled to clients 114A-N via network 116, and may service requested access operations generated by clients 114A-N. The access may be dependent on a type of request made, client permissions, and the like.

File server 102 may be coupled locally to disks 112A-N. Example disks 112A-N may refer to any type of non-volatile storage device/means suitable for storing data. Example disk 112 may include a magnetic disk (e.g., hard disk), an optical disk (e.g., compact disk-read only memory (CD-ROM), digital video/versatile disc (DVD) based storage), magneto-optical (MO) storage, semiconductor-based storage (e.g., flash), and the like. File server 102 may include connectors and/or connection ports for connecting with disks 112A-N. Example connectors and/or connection ports may be connection points for fiber optic cable, coaxial cable, twisted-pair communication lines, and/or secure wireless connections. The connection may support point-to-point or multi-drop connections.

File server 102 may manage disks 112A-N, including receiving and processing read and/or write requests to data, maintaining data structures, organizing the physical resources of disks 112A-N into logical storage resources, and the like. In the example shown in FIGS. 1A and 1B, disks 112A-N are shown as external devices connected to file server 102, however, disks 112A-N can also be implemented as an internal storage of file server 102.

In one example, file server 102 may include write-in-place file system 104, which may represent a file system executed on file server 102 to logically organize the information as a hierarchical structure of files on disks 112A-N. File server 102 may manage data in accordance with write-in-place file system 104. File server 102 may include a decision-making module 108. Decision-making module 108 may extend the capability of write-in-place file system 104 to include the ability to selectively perform redirect-on-write operations on encoded data chunks (e.g., compressed and/or encrypted data chunks). Thus, decision-making module 108 may enhance performance of write-in-place file system 104 in the presence of features like compression and encryption.

As shown in FIG. 1A, write-in-place file system 104 may include a client interface module 106, decision-making module 108, and write module 110. As shown in FIG. 1B, write-in-place file system 104 may also include a read module 118, a decode module 120, an encode module 122, a storage allocation module 124, a storage de-allocation module 126, and a journaling module 128.

Consider that write-in-place file system 104 may include encoded data chunks and unencoded data chunks stored in at least one of disks 112A-N. Example encoded data chunks may include compressed data chunks and/or encrypted data chunks. Example unencoded data chunks may include uncompressed data chunks and/or unencrypted data chunks. Each data chunk may be formed of multiple data blocks that are either encoded or unencoded. For example, an encoded data chunk may include multiple data blocks that are encoded in to a single data chunk. Further, write-in-place file system 104 can reference a data block via at least one disk block number.

For example, consider a file system that provides network file system (NFS) or server message block (SMB) shares to a hypervisor, which the hypervisor may use as a data repository for virtual machines (VMs) running therein. Hypervisor may refer to a virtualization software installed on top of hardware platform and supports a VM execution space within which VMs may be concurrently instantiated and executed. Each VM may implement a virtual hardware platform that supports the installation of a guest operating system (OS) which is capable of executing applications. In such cases, VM data hosted in the NFS or SMB share may include compressed data chunks and uncompressed data chunks. The VM data residing in the data repository can have different regions with varying degrees of compressibility. In this example, file system may determine what regions to be kept compressed and what regions to be kept in the original form.

During operation, client interface module 106 may receive data for a write operation corresponding to at least a portion of at least one data chunk stored in write-in-place file system 104, for instance, from client 114 via network 116. Each client 114 may request services of write-in-place file system 104 on file server 102 by issuing file system protocol messages (i.e., in the form of packets) to file server 102 over network 116. Further during operation, decision-making module 108 may determine whether the at least one data chunk is an encoded data chunk based on associated metadata. Example metadata may include information about the encoded data chunks, the unencoded data chunks, a size of the encoded data chunks and the like.

In one example, write module 110 may include a write-in-place module 130 to perform the write operation to write-in-place modified data blocks corresponding to at least one unencoded data chunk to a same storage location on at least one disk 112 based on the determination. In another example, write module 110 may include a redirect-on-write module 132 to perform the write operation to redirect-on-write modified data blocks corresponding to at least one encoded data chunk to a new storage location on at least one disk 112 based on the determination. Thus, write-in-place file system 104 may redirect-on-write, on a need basis, the data blocks being rewritten by retaining benefits of write-in-place file system 104.

In one example, read module 118 may read at least one encoded data chunk from disk 112. Decode module 120 may decode the at least one encoded data chunk to generate at least one decoded data chunk. Encode module 122 may modify data blocks corresponding to the at least one decoded data chunk based on the data associated with the write operation. Further, encode module 122 may re-encode the modified data blocks to form at least one re-encoded data chunk. Redirect-on-write module 132 may write the at least one re-encoded data chunk at the new storage location on disk 112.

Further, storage allocation module 124 may allocate the new storage location for the modified data blocks corresponding to the at least one encoded data chunk on the disk. Storage de-allocation module 126 may free up a previous storage location corresponding to the at least one encoded data chunk upon allocating the new storage location.

Upon redirecting-on-write the modified data blocks, journaling module 128 may ensure data consistency of write-in-place file system 104 by rewriting the encoded data to the newly allocated storage location and atomically switching the logical view from the old disk blocks to the new disk blocks. Journaling module 128 may atomically update disk block numbers and the disk offset of the modified data blocks corresponding to the at least one encoded data chunk such that one-to-one association between a relative logical offset and a relative disk offset of a file in write-in-place file system 104 is maintained. Thus, the natural alignment of the file's logical view can be retained even after rewrite operations on the file. The disk offset may provide a reference to a physical location of the data blocks and the logical offset may provide a reference to a virtual or logical location of the data blocks. The relative logical offset and the relative disk offset may be used for data blocks aliasing, or referencing the data such that both references may refer to the same data. An example to perform redirect-on-write operation of a compressed data chunk in write-in-place file system 104 is explained in FIGS. 2 and 3A-3C.

Figure 2:
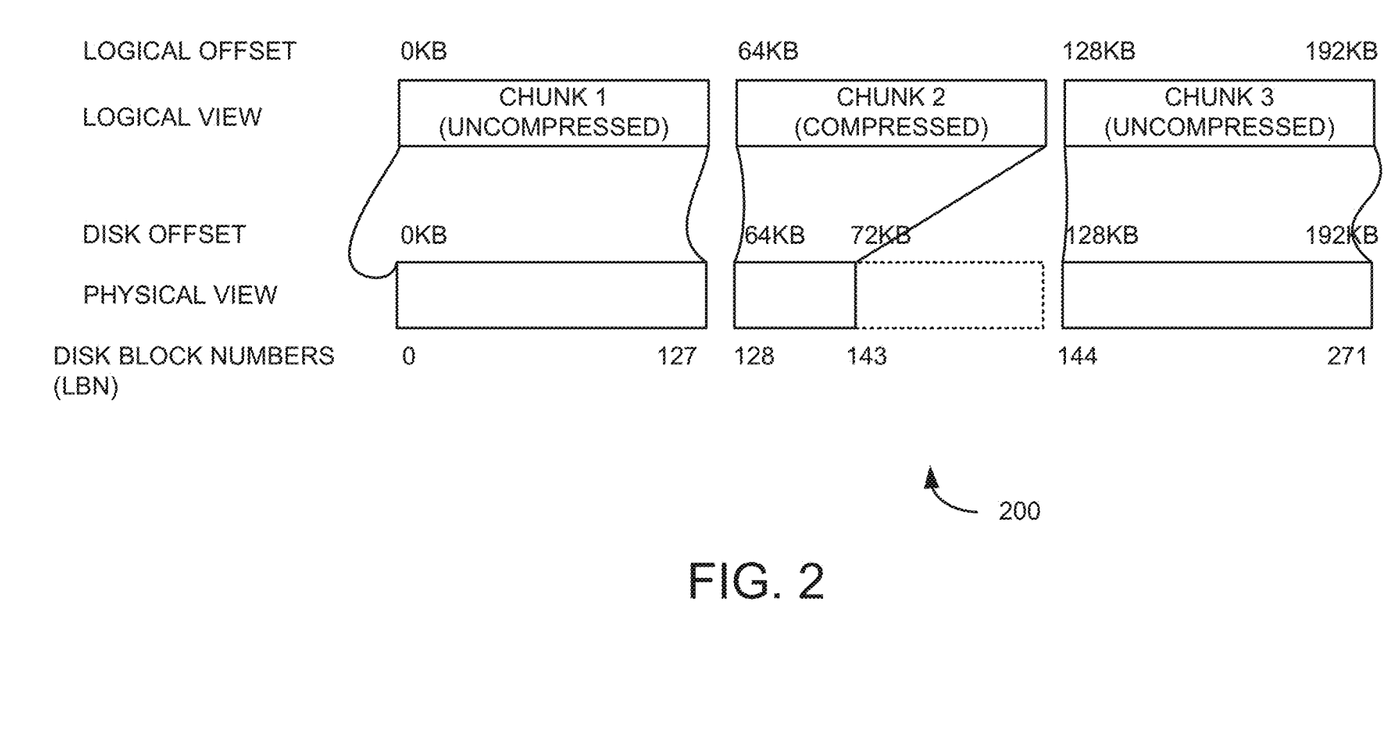
FIG. 2 is an example schematic diagram illustrating a logical view and an on-disk view of a file in a write-in-place file system.
Figure 3A:
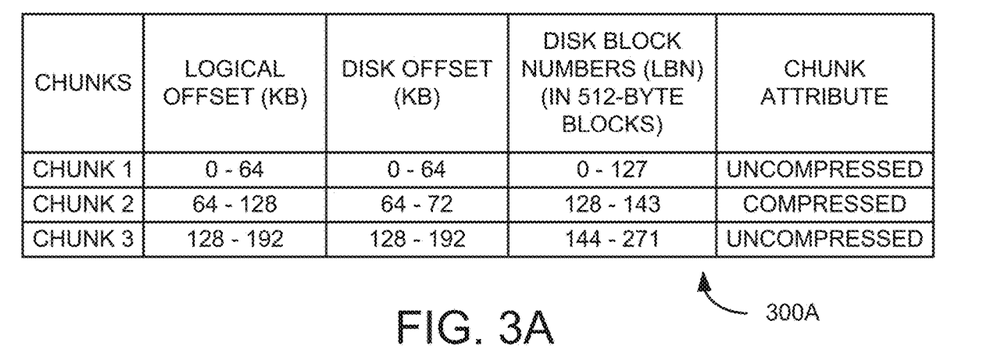
FIG. 3A illustrates an example table depicting a logical offset, a disk offset, and disk block numbers for data chunks that are contiguous and sequentially laid out on a disk.

FIG. 2 is an example schematic diagram 200 illustrating a logical view and an on-disk view of a file in write-in-place file system (e.g., write-in-place file system 104 of FIGS. 1A and 1B). Example schematic diagram 200 may depict a logical offset, a disk offset, disk block numbers (LBN), a logical view, and a physical view of data blocks in the file. FIG. 3A illustrates an example table 300A corresponding to schematic diagram 200 of FIG. 2. Example table 300A depicts a logical offset, a disk offset, and disk block numbers (LBN) corresponding to data chunks (i.e., chunk 1, chunk 2, and chunk 3) that are contiguous and sequentially laid out on a disk. As shown in FIGS. 2 and 3A, the file may include data chunks. Each data chunk may include multiple data blocks that are either encoded or unencoded. Further, write-in-place file system 104 may reference each of the multiple data blocks via at least one disk block number.

In the example shown in FIGS. 2 and 3A, chunk 1 and chunk 3 are uncompressed data chunks and chunk 2 is a compressed data chunk. The disk block numbers, after the initial write, may be contiguous and sequentially laid out on the disk. In this example, each disk block/data block may be of 512 bytes. For uncompressed chunk 1, the 64 KB logical region may occupy 128 disk blocks, i.e., disk block number 0 through disk block number 127. For compressed chunk 2, the 64 KB logical region may be compressed to 8 KB, and may occupy sixteen disk blocks, i.e., disk block number 128 through disk block number 143. For uncompressed chunk 3, the 64 KB logical region may occupy 128 disk blocks, i.e., disk block number 144 through disk block number 271.

Further, write-in-place file system 104 may maintain metadata specific to compression, including a notion of "disk offset view" of the file. Further, disk offset view may be maintained with offset numbers laid out as if the data is uncompressed. This disk offset view may help in simplifying the rewrite operation. Maintaining the start disk offset of a data chunk same as a start logical offset (i.e., natural alignment) may provide an enhanced split/merge of extents on the disk. The disk offset may provide a reference to a physical location of the data blocks of the data chunk and the logical offset may provide a reference to a virtual or logical location of the data blocks of the data chunk.

In one example, consider a rewrite operation to a portion of chunk 1 (e.g., 32 KB to 40 KB). Since chunk 1 is an uncompressed chunk, the data may be rewritten in-place and there may not be any change in the file layout as depicted in table 300B of FIG. 3B.

In another example, consider a rewrite operation to a portion of chunk 2 (e.g., 72 KB to 80 KB). The rewrite operation may involve reading the compressed chunk 2, decompressing the compressed data chunk 2, merging new data being modified in the decompressed chunk 2, and then re-compressing 64 KB of the modified chunk 2. The re-compressed chunk 2 may not be written in-place and a redirect-on-write may be performed. In this example, consider the re-compressed chunk 2 may need 16 KB, i.e., the storage needed is 16 KB (instead of 8 KB needed for encoding the data previously) on the disk. Therefore, a new 16 KB worth of storage can be allocated for the re-compressed chunk 2 and the previous 8 KB worth of storage can be freed. The disk block numbers and the disk offset/disk offset range of re-compressed chunk 2 may be atomically updated (e.g., 302 and 304, respectively) as depicted in table 300C of FIG. 3C. With selective and intelligent redirect-on-write, write-in-place file system 104 can reap benefits provided by the features like compression and encryption while retaining the inherent benefits of the write-in-place file system 104. Further, the natural alignment of the data blocks of the file in the write-in-place file system 104 can be maintained.

In one example, the components of write-in-place file system 104 may be implemented in hardware, machine-readable instructions or a combination thereof. In one example, each of client interface module 106, decision-making module 108, write module 110, read module 118, decode module 120, encode module 122, storage allocation module 124, storage de-allocation module 126, and journaling module 128 can be any combination of hardware and programming to implement the functionalities described herein. In another example, the functionality of the components of write-in-place file system 104 may be implemented using technology related to personal computers (PCs), server computers, tablet computers, mobile computers and the like.

Figure 3B:
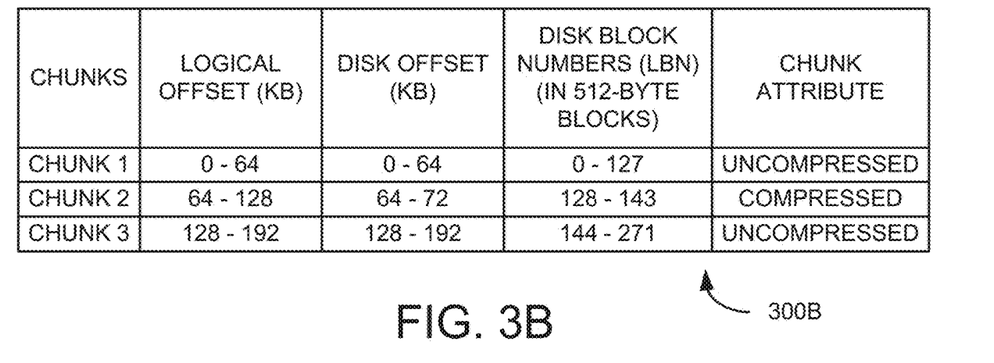
FIG. 3B illustrates an example table depicting a logical offset, a disk offset, and disk block numbers of the data chunks upon performing a write-in-place operation on an unencoded data chunk.
Figure 3C:
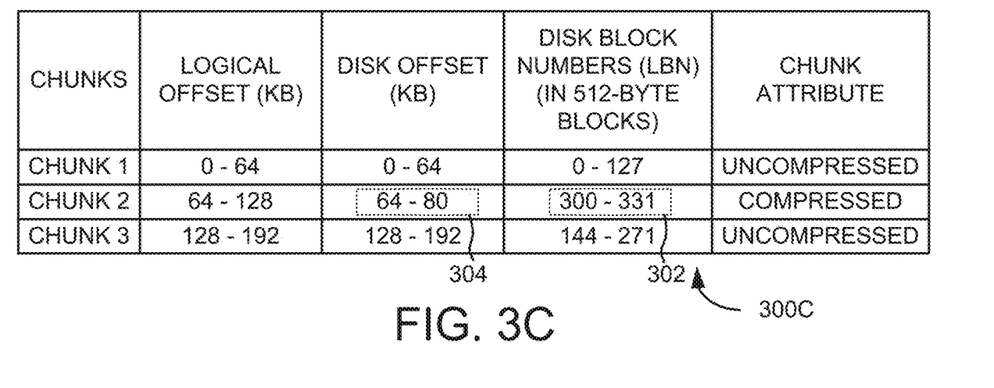
FIG. 3C illustrates an example table depicting a logical offset, a modified disk offset, and modified disk block numbers of the data chunks upon performing a redirect-on-write operation on an encoded data chunk.

System 100 may include computer-readable storage medium comprising (e.g., encoded with) instructions executable by a processor to implement functionalities described herein in relation to FIGS. 1-3. In some examples, the functionalities described herein in relation to instructions to implement functions of components of write-in-place file system 104 and any additional instructions described herein in relation to storage medium, may be implemented as engines or modules comprising any combination of hardware and programming to implement the functionalities of the modules or engines. In examples described herein, the processor may include, for example, one processor or multiple processors included in a single computing device or distributed across multiple computing devices.

Figure 4:
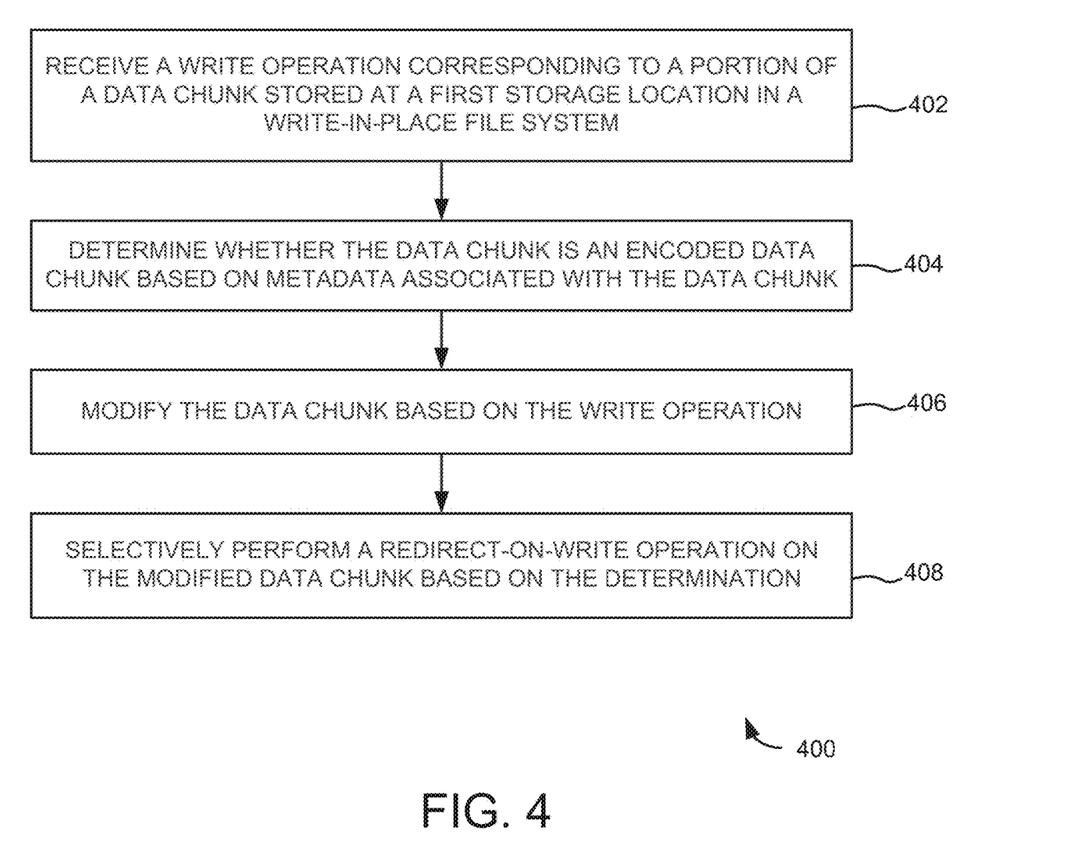
FIG. 4 is a flowchart of an example method for selectively performing a redirect-on-write operation on data chunks in a write-in-place file system.

FIG. 4 is a flowchart of an example method 400 for selectively performing a redirect-on-write operation on data chunks in a write-in-place file system. Method 400 may be described below as being executed or performed by a system, for example, system 100 (FIGS. 1A and 1B). In various examples, method 400 may be performed by hardware, software, firmware, or some combination thereof. Other suitable systems and/or computing devices may be used as well. Method 400 may be implemented in the form of executable instructions stored on at least one machine-readable storage medium of the system and executed by at least one processor of the system. Alternatively or in addition, method 400 may be implemented in the form of electronic circuitry (e.g., hardware). In alternate examples of the present disclosure, some blocks of method 400 may be executed substantially concurrently or in a different order than shown in FIG. 4. In alternate examples of the present disclosure, method 400 may include more or fewer blocks than are shown in FIG. 4. In some examples, some blocks of method 400 may, at certain times, be ongoing and/or may repeat.

At 402, a write operation corresponding to a portion of a data chunk may be received. The data chunk may be stored at a first storage location (e.g., in at least one disk) in a write-in-place file system. The write-in-place file system may include encoded data chunks and unencoded data chunks. For example, the write-in-place file system may include encoded data chunks and unencoded data chunks such that disk block numbers after an initial write are contiguous and sequentially laid out on the disk. In another example, write-in-place file system 104 may include the encoded data chunks and the unencoded data chunks such that disk block numbers after an initial write may be discontiguous and not sequentially laid out on the disk.

For example, when a file in the write-in-place file system is extended and grown, new data can be compressed and written. The decision whether to compress and write (or) write the data in an uncompressed form can be based on the data pattern, history of compressibility, and the savings due to compression. For example, when the compression involves minimal benefits, for instance, less than 40% savings, the data can be written uncompressed. Thus, the file may include any combination of compressed and uncompressed data chunks. The write-in-place file system may track what regions are kept compressed or uncompressed in associated metadata. Further, when any region is compressed (i.e., encoded), the metadata can include the size of the compressed data chunk.

At 404, a check is made to determine whether the data chunk may be an encoded data chunk based on metadata associated with the data chunk. Example encoded data chunks may include compressed data chunks and/or encrypted data chunks. Example metadata may include information about the encoded data chunks, the unencoded data chunks, and a size of the encoded data chunks.

At 406, the data chunk may be modified based on the write operation. In one example, when the data chunk is the encoded data chunk, then the encoded data chunk may be read from the first storage location. The encoded data chunk may be decoded to generate a decoded data chunk. The decoded data chunk may be modified based on new data associated with the write operation. Further, the modified data chunk may be re-encoded to form the re-encoded data chunk.

In one example, the data chunk can be determined as the encoded data chunk based on a physical view (i.e., disk offset view) of the data chunk before and after the write operation. For example, the physical view of the data chunks before and after a rewrite operation can be looked at and judiciously decided what portion can be written-in-place and what portion can be redirected-on-write. For example, the region of rewrite may be looked at to determine what the region encompasses, i.e., the sequence and combination of compressed and uncompressed data chunks. Portion associated with uncompressed data chunks may be written in place and portion associated with compressed data chunks may be redirected and written. Thus, redirect-on-write operations can be minimized, while retaining the inherent benefits of the write-in-place file system.

At 408, a redirect-on-write operation may be selectively performed on the modified data chunk based on the determination. In one example, selectively performing the redirect-on-write operation on the modified data chunk may include performing the redirect-on-write operation to write the modified data chunk at a second storage location (e.g., in the at least one disk) in the write-in-place file system when the data chunk is the encoded data chunk and performing a write-in-place operation to write the modified data chunk at the first storage location in the write-in-place file system when the data chunk is not the encoded data chunk. For example, the redirect-on-write operation may be performed to write the re-encoded data chunk at the second storage location in the write-in-place file system when the data chunk is the encoded data chunk.

Further, disk block numbers and a disk offset of the re-encoded data chunk may be atomically updated corresponding to the second storage location by maintaining one-to-one association between a relative logical offset and a relative disk offset of a file in the write-in-place file system. In one example, upon performing the redirect-on-write operation on the re-encoded data chunk, the re-encoded data chunk may be stored on a disk by maintaining a start disk offset of the re-encoded data chunk same as a start logical offset of the re-encoded data chunk and with different disk block numbers for the re-encoded data chunk.

FIGS. 5A and 5B are block diagrams of an example computing device 500, such as a storage server or file server 102 of FIGS. 1A and 1B, for redirecting-on-write encoded data chunks in a write-in-place file system. In the examples of FIGS. 5A and 5B, a computing device 500 may include a processor 502 and a machine-readable storage medium 504. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 502 may refer to at least one central processing unit (CPUs), microprocessor, and/or other hardware device suitable for retrieval and execution of instructions stored in machine-readable storage medium 504. Particularly, FIG. 5A is a block diagram of example computing device 500 for performing a redirect-on-write operation on encoded data chunks in a write-in-place file system. FIG. 5B is a block diagram of the example computing device 500 of FIG. 5A, depicting additional features. In the particular example shown in FIG. 5B, processor 502 may fetch, decode, and execute instructions 506-520 to determine whether to encode modified encoded data chunks and modified unencoded data chunks in the write-in-place file system into a single encoded data chunk and then perform redirect-on-write on encoded data chunks based on the determination. Instructions 506-514 of FIGS. 5A and 5B may be similar and provide similar functionalities/features when executed by processor 502.

As an alternative or in addition to retrieving and executing instructions, processor 502 may include at least one electronic circuit including a number of electronic components for performing the functionality of at least one of the instructions in machine-readable storage medium 504. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 504 may be any electronic, magnetic, optical, or other physical storage device that stores executable instructions. Thus, machine-readable storage medium 504 may be, for example, Random Access Memory (RAM), an Electrically-Erasable Programmable Read-Only Memory (EEPROM), a storage drive, an optical disc, and the like. Machine-readable storage medium 504 may be disposed within computing device 500, as shown in FIGS. 5A and 5B. In this situation, the executable instructions may be "installed" on computing device 500. Alternatively, machine-readable storage medium 504 may be a portable, external or remote storage medium, for example, that allows computing device 500 to download the instructions from the portable/external/remote storage medium.

Referring to FIG. 5B, instructions 506 when executed by processor 502, may cause processor 502 to receive a write operation corresponding to a file in a write-in-place file system. The file may include an encoded data chunk and an unencoded data chunk stored at respective storage locations, for instance, on a storage device (e.g., disks). Instructions 508 when executed by processor 502, may cause processor 502 to modify the encoded data chunk and the unencoded data chunk based on the write operation.

Instructions 510 when executed by processor 502, may cause processor 502 to determine whether to encode the modified encoded data chunk and the modified unencoded data chunk into a single encoded data chunk based on parameters for encoding. Example parameters for encoding may be selected from a group consisting of a data pattern, a history of encoding, a type of encoding, and savings due to encoding. For example, parameters for compression may include a data pattern, a history of compressibility, savings (e.g., storage savings) due to compression, and the like.

In one example, instructions 512 when executed by processor 502, may cause processor 502 to encode the modified encoded data chunk and the modified unencoded data chunk into the single encoded data chunk when the determination is made to encode the modified encoded data chunk and the modified unencoded data chunk into the single encoded data chunk. Instructions 514 when executed by processor 502, may cause processor 502 to perform a redirect-on-write operation to write the single encoded data chunk at a new storage location in the write-in-place file system.

Instructions 516 and 518 when executed by processor 502, may cause processor 502 to perform a write-in-place operation to write the modified unencoded data chunk to a same storage location in the write-in-place file system and perform a redirect-on-write operation to write the modified encoded data chunk at the new storage location in the write-in-place file system, respectively, when the determination is made not to encode the modified encoded data chunk and the modified unencoded data chunk into the single encoded data chunk.

Instructions 520 when executed by processor 502, may cause processor 502 to atomically update disk block numbers and a disk offset of the modified encoded data chunk or the single encoded data chunk corresponding to the new storage location by maintaining one-to-one association between a relative logical offset and a relative disk offset of the file in the write-in-place file system upon performing the redirect-on-write operation on the modified encoded data chunk or the single encoded data chunk, respectively.

For example, consider a scenario where the file may include three data chunks whose logical size is 128 KB. Further, consider that the first data chunk may be compressed from an input size of 32 KB to 16 KB on the disk, second data chunk may be uncompressed and include a size of 32 KB, and a third data chunk may be compressed from an input size of 64 KB to 24 KB on the disk.

In this example, consider that the user may be overwriting the 128 KB of the file. In this scenario, for the 128 KB rewrite, the write-in-place file system may need to redirect-on-write the first data chunk and the third data chunk, and write-in-place the second data chunk. However, the write-in-place file system may determine whether to compress the 128 KB of the file based on compression parameters. In one example, the write-in-place file system may ascertain a value in recompressing the rewrite "as a whole 128 KB". For example, the write-in-place file system may ascertain that the new (i.e., rewritten) 128 KB of data can be compressed to 8 KB, which can be a considerable amount of savings. In this case, the write-in-place file system may perform a redirect-on-write for 8 KB, and the storage associated with the previous data (i.e., 16 KB+32 KB+24 KB) can be freed.

When the write-in-place file system does not see a value in recompressing the 128 KB (i.e., data being rewritten) as a whole, the write-in-place file system may redirect-on-write the first data chunk and the third data chunk and write-in-place the second data chunk of 32 KB. Even though FIGS. 1 to 5 may be described with respect to encoding features such as compression and encryption, examples described herein can also be used in the presence of any other type of encoding features.

It may be noted that the above-described examples of the present solution are for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method, comprising:
    receiving a write operation corresponding to a file in a write-in-place file system, wherein the file comprises an encoded data chunk and an unencoded data chunk stored in respective storage locations;
    modifying the encoded data chunk and the unencoded data chunk based on the write operation;
    determining whether to encode the modified encoded data chunk and the modified unencoded data chunk into a single encoded data chunk based on parameters for encoding; and
    based on a result of the determination either:
        encoding the modified encoded data chunk and the modified unencoded data chunk into the single encoded data chunk and performing a redirect-on-write operation to write the single encoded data chunk at a new storage location in the write-in-place file system; or
        performing a write-in-place operation to write the modified unencoded data chunk to the same storage location and performing a redirect-on-write operation to write the modified encoded data chunk at the new storage location in the write-in-place file system.

2. The method of claim 1, wherein encoded data chunks of the write-in-place file system comprise at least one of compressed data chunks and encrypted data chunks.

3. The method of claim 1, wherein the parameters for encoding comprise one or more of a data pattern, a history of encoding, a type of encoding, or savings due to encoding.

4. The method of claim 1, comprising:
    receiving another write operation corresponding to at least a portion of a given data chunk stored at a given storage location in the write-in-place file system;
    determining whether the given data chunk is an encoded data chunk based on metadata associated with the data chunk;
    modifying the given data chunk based on the another write operation; and
    selectively performing a redirect-on-write operation on the modified given data chunk based on the determination.

5. The method of claim 4, wherein selectively performing the redirect-on-write operation on the modified given data chunk based on the determination of whether the given data chunk is an encoded data chunk comprises:
    performing a redirect-on-write operation to write the modified given data chunk at another storage location in the write-in-place file system when the given data chunk is an encoded data chunk; and
    performing a write-in-place operation to write the modified given data chunk at the given storage location in the write-in-place file system when the given data chunk is not an encoded data chunk.

6. The method of claim 5, wherein when the given data chunk is an encoded data chunk, modifying the given data chunk based on the another write operation comprises:
    reading the encoded given data chunk from the given storage location;
    decoding the encoded given data chunk to generate a decoded given data chunk;
    modifying the decoded given data chunk based on new data associated with the another write operation; and
    re-encoding the modified given data chunk to form a re-encoded given data chunk, wherein the redirect-on-write operation is performed to write the re-encoded given data chunk at the another storage location in the write-in-place file system.

7. The method of claim 6, wherein upon performing the redirect-on-write operation on the re-encoded given data chunk, the re-encoded given data chunk is stored on a disk by maintaining a start disk offset of the re-encoded given data chunk the same as a start logical offset of the re-encoded given data chunk and with different disk block numbers for the re-encoded given data chunk.

8. The method of claim 6, comprising:
    atomically updating disk block numbers and a disk offset of the re-encoded given data chunk corresponding to the another storage location by maintaining one-to-one association between a relative logical offset and a relative disk offset of a file in the write-in-place file system.

9. A file server comprising:
    a processor; and a non-transitory computer-readable storage medium comprising instructions executable by the processor to:
receive data for a write operation corresponding to at least a file in a write-in-place file system, the file comprising an encoded data chunk and an unencoded data chunk stored at respective storage locations;
modify the encoded data chunk and the unencoded data chunk based on the write operation;
determine whether to encode the modified encoded data chunk and the modified unencoded data chunk into a single encoded data chunk based on parameters for encoding; and
when a determination is made to encode the modified encoded data chunk and the modified unencoded data chunk based on parameters for encoding:
encode the modified encoded data chunk and the modified unencoded data chunk into the single encoded data chunk; and
perform a redirect-on-write operation to write the single encoded data chunk to a new storage location in the write-in-place file system.

10. The file server of claim 9, wherein the instructions comprise instructions executable by the processor to:
atomically update disk block numbers and a disk offset of the modified given data chunk such that a one-to-one association between a relative logical offset and a relative disk offset of a file in the write-in-place file system is maintained.

11. The file server of claim 9, wherein the instructions comprise instructions executable by the processor to:
receive another write operation corresponding to at least a portion of a given data chunk stored at a given storage location in the write-in-place file system;
determine whether the given data chunk is an encoded data chunk based on associated metadata;
when the given data chunk is an unencoded data chunk, perform the another write operation to write-in-place a modified version of the given data chunk to the given storage location on the disk; and
when the given data chunk is an encoded data chunk, perform the another write operation to redirect-on-write a modified version of the given data chunk to a new storage location on the disk.

12. The file server of claim 11, wherein the instructions comprise instructions executable by the processor to, when the given data chunk is an encoded data chunk:
read the encoded given data chunk from the disk;
decode the encoded given data chunk to generate a decoded version of the given data chunk; and
modify data blocks corresponding to the decoded given data chunk based on the data associated with the write operation and re-encode the modified data blocks to form at least one re-encoded version of the given data chunk; and
write the re-encoded given data chunk at the new storage location on the disk.

13. The file server of claim 12, wherein the instructions comprise instructions executable by the processor to:
allocate the new storage location for the modified given data chunk; and
free up a previous storage location corresponding to the encoded given data chunk upon allocating the new storage location.

14. The file server of claim 11, wherein:
the write-in-place file system comprises a plurality of encoded data chunks and a plurality of unencoded data chunks; and
the metadata comprises information about:
the encoded data chunks;
the unencoded data chunks; and
sizes of the encoded data chunks.

15. The file server of claim 14, wherein each of the encoded data chunks and unencoded data chunks comprises multiple data blocks; wherein the encoded data chunks comprise at least one of compressed data chunks and encrypted data chunks, and wherein the unencoded data chunks comprise at least one of uncompressed data chunks and unencrypted data chunks.

16. The file server of claim 9, wherein the parameters for encoding comprise one or more of a data pattern, a history of encoding, a type of encoding, or savings due to encoding.

17. A non-transitory computer-readable storage medium comprising instructions that, when executed by a processor, cause the processor to:
receive a write operation corresponding to a file in a write-in-place file system, wherein the file comprises an encoded data chunk and an unencoded data chunk stored at respective storage locations;
modify the encoded data chunk and the unencoded data chunk based on the write operation;
determine whether to encode the modified encoded data chunk and the modified unencoded data chunk into a single encoded data chunk based on one or more parameters for encoding;
when a determination is made to encode the modified encoded data chunk and the modified unencoded data chunk:
encode the modified encoded data chunk and the modified unencoded data chunk into the single encoded data chunk; and
perform a redirect-on-write operation to write the single encoded data chunk at a new storage location in the write-in-place file system;
when a determination is made not to encode the modified encoded data chunk and the modified unencoded data chunk into the single encoded data chunk:
perform a write-in-place operation to write the modified unencoded data chunk to the same storage location in the write-in-place file system; and
perform a redirect-on-write operation to write the modified encoded data chunk to another storage location in the write-in-place file system.

18. The non-transitory computer-readable storage medium of claim 17, comprising instructions to:
atomically update disk block numbers and a disk offset of the modified encoded data chunk or the single encoded data chunk such that a one-to-one association between a relative logical offset and a relative disk offset of the file in the write-in-place file system upon performing the redirect-on-write operation on the modified encoded data chunk or the single encoded data chunk.

19. The non-transitory computer-readable storage medium of claim 17, wherein the one or more parameters for encoding comprise one or more of a data pattern, a history of encoding, a type of encoding, or savings due to encoding.

* * * * *